United States Patent [19]

Lipscomb

[11] Patent Number: 5,023,918
[45] Date of Patent: Jun. 11, 1991

[54] CROSS-PRODUCT FILTER

[75] Inventor: James S. Lipscomb, Yorktown Heights, N.Y.

[73] Assignee: International Business Machines Corporation, Armonk, N.Y.

[21] Appl. No.: 416,564

[22] Filed: Oct. 3, 1989

[51] Int. Cl.$^5$ .............................................. G06K 9/00
[52] U.S. Cl. ........................................ 382/24; 382/31
[58] Field of Search .................. 382/13, 24, 31, 21, 382/56

[56] References Cited

U.S. PATENT DOCUMENTS

| | | | |
|---|---|---|---|
| 3,993,976 | 11/1976 | Ginsburg | 382/31 |
| 4,282,511 | 8/1981 | Southgate et al. | 382/31 |
| 4,731,859 | 3/1988 | Holter et al. | 382/31 |
| 4,837,843 | 6/1989 | Owechko | 382/31 |
| 4,901,358 | 2/1990 | Bechet | 382/13 |

Primary Examiner—Stephen Brinich
Attorney, Agent, or Firm—Jack M. Arnold

[57] ABSTRACT

Method and apparatus for filtering a sequence of digital values representative of endpoints of vectors which represent the stroke of a writing instrument on a writing tablet. The cross-product and dot-product of the vectors comprising the stroke are computed to produce a sample of points which are close together where the stroke curves sharply, and which are further apart where the stroke is substantially straight.

9 Claims, 16 Drawing Sheets

Cross product ignores input jitter.

For threshold "T" $\overline{ab}$ and $\overline{bc}$ are so short that impossible for $|\overline{ab} \times \overline{bc}| > T$. Jitter ignored.

$|\overline{ab} \times \overline{bc}| < T$ still, but approaching threshold. Pen motion still ignored.

$|\overline{ab} \times \overline{bc}| > T$. Save point b (point 5) for algorithm output. Output will be points #1, #5, etc.

FIG. 1
Summation
FIG. 1A — Stroke input:
FIG. 1B — Initial features:
FIG. 1C — Significant features:
FIG. 1D — Stroke recognized, and token produced:
"summation"

FIG. 2
FIG. 2A
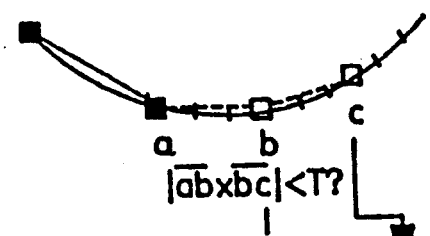
FIG. 2B
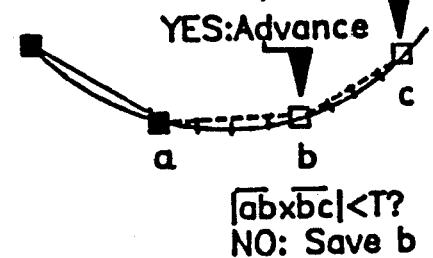
FIG. 2C
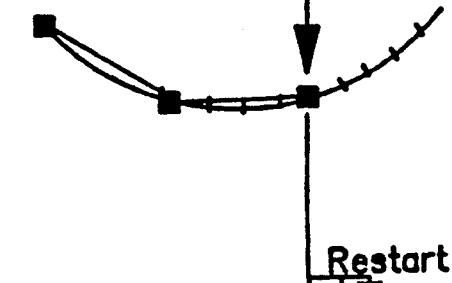
FIG. 2D
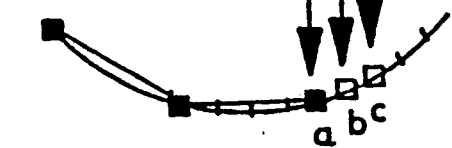

FIG. 3  Output

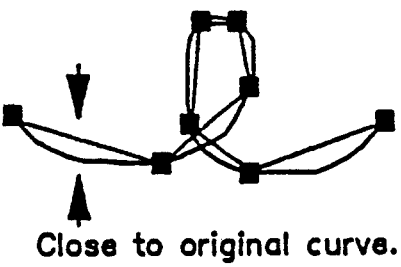

Equal cross products between vectors.

Close to original curve.

FIG. 4  Jitter
Cross product ignores input jitter.

FIG. 4A
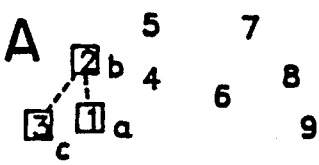

For threshold "T" $\overline{ab}$ and $\overline{bc}$ are so short that impossible for $|\overline{ab} \times \overline{bc}| > T$. Jitter ignored.

FIG. 4B
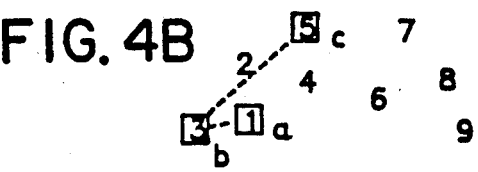

FIG. 4C
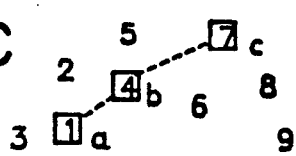

$|\overline{ab} \times \overline{bc}| < T$ still, but approaching threshold. Pen motion still ignored.

FIG. 4D
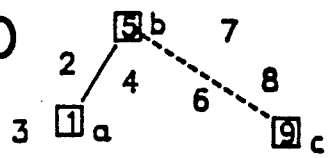

$|\overline{ab} \times \overline{bc}| > T$. Save point b (point 5) for algorithm output. Output will be points #1, #5, etc.

FIG. 9
Wild points
Wild point detected and removed.
FIG. 9A
Stroke input:
 Wild point.
FIG. 9B
Cross-product filter just before dot-product test:
FIG. 9C
Wild point removed:

FIG. 11
Ignoring small wiggles
'c' close to 'b' finds small wiggles:
FIG. 11A
$|\overline{ab} \times \overline{bc}| < T$. Advance 'b' and 'c'.
FIG. 11B
$|\overline{ab} \times \overline{bc}| > T$. Save 'b' for output. Big increase in $|\overline{ab} \times \overline{bc}|$, because angle abc changes greatly as point 'b' slides down.
FIG. 11C
Eventually ...
... wiggle considered significant.

'c' far ahead of 'b' ignores small wiggles:

$|\overline{ab} \times \overline{bc}| < T$, and stays small as point 'c' slides forward.

Eventually ...

... wiggle overlooked.

FIG. 12

Cross product by itself misses thin loops:

$|\overline{ab} \times \overline{bc}| < T$, so advance 'b' and 'c.'

$|\overline{ab} \times \overline{bc}| < T$ still, since $\overline{ab}$ nearly parallel to $\overline{bc}$. Direction reversal not detected.

Eventually, the loop is missed.

FIG. 13

Dot product finds thin loops
missed by cross product:

$|\overline{ab} \times \overline{bc}| < T$, and $\overline{ab} \cdot \overline{bc} > 0$, so advance 'b' and 'c.'

$|\overline{ab} \times \overline{bc}| < T$, but $\overline{ab} \cdot \overline{bc} < 0$, which indicates direction reversal, ...

... so save b for output.

Eventually, the loop is found.

FIG. 14
Finding corners
FIG. 14A Cross product combined with dot product sometimes misses corners:
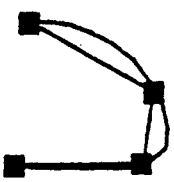
Corner missed.
FIG. 14B Fix: Search for corner:
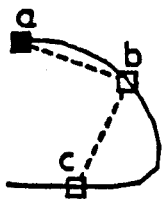
$|\overline{ab} \times \overline{bc}| > T$, but do not save 'b' yet.
FIG. 14C
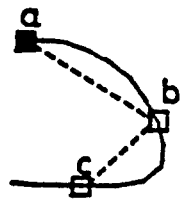
Advance 'b.' Angle abc gets smaller.
FIG. 14D
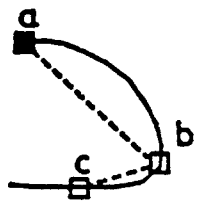
Advance 'b.' Angle abc is at a minimum.
FIG. 14E
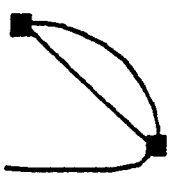
Save 'b' for output.

FIG. 16
End stroke
Cross product misses small feature at end of stroke:
FIG. 16A
$|\vec{ab} \times \vec{bc}| < T.$
FIG. 16B
$|\vec{ab} \times \vec{bc}| < T$, misses small, significant feature at end, because angle abc changed little.
FIG. 16C
Algorithm has reached end. Remember where 'b' stopped. Save 'c' for output.

FIG. 17
Fix: Restart algorithm backwards:
FIG. 17A — Restart.
FIG. 17B — Corner found. Save 'b.'
FIG. 17C — Algorithm reaches place where 'b' stopped on forward pass. Stop. Produce output.

CROSS-PRODUCT FILTER

The invention is in the field of signal processing, and in particular is directed to handwriting recognition. Specifically, the invention is directed to a cross-product filter for hand-drawn strokes, to find candidate features for subsequent feature extraction.

CROSS REFERENCE TO RELATED APPLICATION

Reference is made to U.S. patent application Ser. No. 421,211, filed on 10/13/89, which is entitled "Multi-Scale Recognizer For Hand Drawn Strokes", which application is assigned to the assignee of this patent application, and which describes a method and apparatus for recognizing the filtered stroke produced by the cross-product filter of this application.

BACKGROUND OF THE INVENTION

In many signal processing applications a digitizing tablet is used to convert pen or stylus motion into a set of electrical data which is then processed by digital equipment.

Typically, there is a special electronic or electromagnetic grid or surface which detects the X and Y position of the pen as it moves along the surface at a periodic rate. The information is present as two digital data words at a periodic clock rate. This class of technology is used for signature verifications, automatic drafting, graphics, character recognition, handwriting recognition and so forth. In each case, the user writes on the writing surface with the writing instrument and the position is monitored electronically.

In connecting such a device directly to a processing system there are problems because the raw data may contain certain kinds of noise and other defects that can adversely effect applications that process the data for editing, character recognition, graphics and other uses. The noise may be electrical or mechanical noise produces by the equipment employed to generate the sequence of signals corresponding to the stroke of the writing instrument.

An input filter for hand drawn strokes can be a dominant computation cost for handwriting recognition, because input points vastly outnumber features. There are a number of patents in the handwriting recognition area, each having certain advantages and disadvantages.

In U.S. Pat. No. 4,375,081 to B. Blesser there is described a technique for removing or minimizing noise over the length of a stroke caused by writing slowly. The technique comprises filtering a signal represented by a first series of indicia where each indicium of the series represents an amplitude by serially averaging the amplitudes of sets on n indicia of the series to form a second series of indicia and serially amplitude comparing each subsequently occurring indicium thereof to form a third series of indicia which includes those indicia resulting from comparisons having an amplitude difference greater than a predetermined amount. A tablet periodically emits two dimensional values representing the x and y positions of a stylus. A first smoother is a two dimensional lowpass filter which averages the data from the tablet in a running average. This operation reduces the electrical noise since the averaging takes place over a fixed number p of points. This reduces the electrical noise in the data. Note this averaging is in terms of time since a fixed number of points corresponds to a fixed time interval. Further since this operation reduces the bandwidth of the data, the data can be resampled in the space domain. A resampler discards points which are too close together. Hence, it only keeps points which are spaced more than some threshold amount K. The resampler thus creates a space sampling rather than a time sampling. A second smoother performs another averaging or lowpass operation which smoothes data in the space domain rather than in the time domain.

In U.S. Pat. No. 4,284,975 to K. Odaka there is disclosed a pattern recognition system for hand-written characters operating on an on-line basis comprising a character input unit for providing the coordinates of a plurality of points on strokes of a hand-written input character, an approximate unit for providing some feature points for each stroke of the input character, a pattern difference calculator for providing the sum of the length between the feature points of the input character and those of the reference characters which are stored in the reference pattern storage, and a minimum value of the difference among the pattern differences thus calculated and determining the input character as the reference character which provides the minimum difference.

In U.S. Pat. No. 4,653,107 to Sojima et al method and apparatus are described for on-line recognition of a handwritten pattern. Coordinates of a handwritten pattern drawn on a tablet are sequentially sampled by a pattern recognition unit to prepare pattern coordinate data. Based on an area encircled by segments created by the sampled pattern coordinate data of one stroke and a line connecting a start point and an end point of the one-stroke coordinate data, the sampled pattern coordinate data of the one stroke is converted to a straight line and/or curved line segments. The converted segments are quantized and normalized. The segments of the normalized input pattern are rearranged so that the input pattern is drawn in a predetermined sequence. Differences between direction angles for the rearranged segments are calculated. Those differences are compared with differences of the direction angles of the dictionary patterns read from a memory to calculate a difference therebetween. The matching of the input pattern and the dictionary pattern is determined in accordance with the difference. If the matching fails, the first or last inputted segment of the input pattern is deleted or the sampled pattern coordinate data of the next stroke is added, to continue the recognition process.

In U.S. Pat. No. 4,718,103 to Shojima et al a method and apparatus are described for recognizing handwritten patterns. A handwritten pattern approximated to a series of polygonal lines consisting of segments is compared with a candidate pattern selected from dictionary patterns stored in the memory, basing on the angular variation between adjacent segments of both patterns. If the difference between angular variations of adjoining segments of both patterns is outside of a certain range, it is tested whether the difference between an angular variation across three or more consecutive segments and the above reference angular variation is within the range.

In U.S. Pat. No. 4,365,235 to E. Greanias et al a Chinese/Kanji on-line recognition system is described. consisting of four main sections these being tablet electronics. a signal filter and segment integration unit, a base stroke classification unit and a symbol element recognition unit and a symbol recognition output table. The tablet electronics provides pen coordinate signals and pen up/down signals which are applied to the signal filter and segment integration unit to define segments of strokes which correspond to continuous motion of a pen on a tablet in a fixed direction. The base stroke classification unit classifies the motion of the pen between pen down and pen up occurrences in one of 42 categories and also indicates if the stroke has crossed a prior stroke. This is then analyzed by the symbol element recognition unit which interprets the base strokes that have been recorded for the word and generates a sequence of symbol elements, referred to as "alphabet" components, that occur in this symbol. The sequence of symbol elements are interpreted in the symbol recognition output table which provides a form of a simple table look-up to determine the word that had been written. Only 72 basic symbol elements (alphabet) are required to synthesize all of the Chinese/Kanji vocabulary. Successive pen positions, received from the tablet electronics are compared in order to filter out excessive data due to pauses in the pen motion or due to random signal fluctuations. These fluctuations occur as a result of the tablet's finite spatial resolution and sampling time. The filtering algorithm that is used produces new output coordinates whenever the pen position differs from the preceding filter threshold, also called the filter constant, is adjusted to be somewhat smaller when the pen has begun to move across the table than it is when the pen is placed down on the tablet.

According to the present invention an input filter for handwriting recognition requires no pre-filtering or smoothing. This is so, as a cross-product filter is utilized. The mathematical properties of the cross product of vectors, comprising a stroke, substantially eliminates x-y jitter. Short strokes have small cross products. The cross product is the length of one vector, times the length of another vector, times the sine of the angle between them. If the vectors are short, no angle can make the cross product greater than a jitter threshold.

OBJECTS OF THE INVENTION

It is an object of the invention to provide an improved input filter for a signal processing system.

It is another object of the invention to provide an improved input filter for a signal processing system that eliminates the need for pre-filter smoothing.

It is a further object of the invention to provide a high speed cross-product input filter for a handwriting recognition system.

DISCLOSURE OF THE INVENTION

Method and apparatus is described for filtering a sequence of digital values representing a stroke of a stylus on a tablet. The cross-product of vectors comprising the stroke is computed to produce a sample of points close together where the stroke curves sharply, and farther apart where the stroke is substantially straight.

BRIEF DESCRIPTION OF THE DRAWINGS

FIGS. 1A-1D illustrate successive filtering steps for going from an input stroke to a significant feature;

FIG. 2A, 2B, 2C AND 2D illustrate successive steps in the filtering process performed by the filter of FIG. 6;

FIG. 3 illustrates the filter output;

FIGS. 4A-4D illustrates how the cross product ignores filter on the input;

FIGS. 9A, 9B and 9C illustrates how wild points in a stroke are detected and removed;

FIGS. 11A, 11B, 11C, 11D, 11E, 11F and 11G illustrate how small wiggles in a stroke are ignored;

FIGS. 14A-14E illustrates how corners of a stroke are found;

FIGS. 16A, 16B and 16C illustrate how the cross-product misses small features at the end of a stroke;

FIGS. 17A, 17B and 17C illustrate how to restart the algorithm backwards to produce an output.

DESCRIPTION OF THE PREFERRED EMBODIMENT

Figure 5:
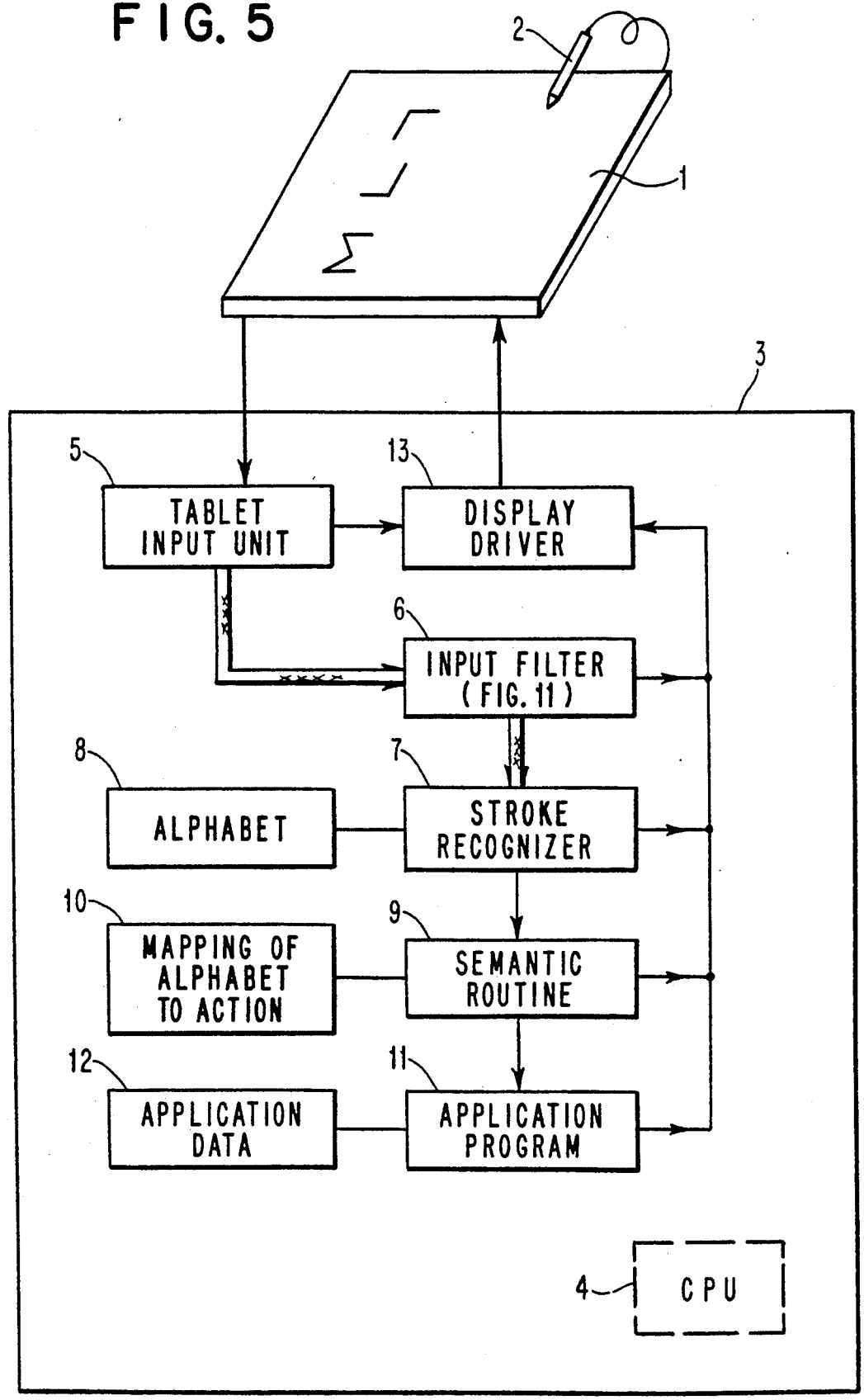
FIG. 5 is a general block diagram of the recognition system of the invention.

This algorithm was not built for symbols of natural languages, but rather for artificial languages, such as geometric shapes like the rectangle and the circle, and other symbols used in proofreading, mathematics, music, etc.. However, the algorithm may be used in a natural language system.

Hand-drawn symbols can consist of several strokes. A stroke is the figure drawn from a pen-down to pen-up position. Each stroke is recognized as a low-level symbol, say a line, and then grouped with other low-level symbols to form some higher-level symbol, say the letter H. Sometimes, a stroke is a complete symbol, for example a summation sign as shown in FIG. 1A.

Reliable, sophisticated feature extraction programs are too slow to process every input point, so there must be a fast input filter that reduces the many input points from the inking device of FIG. 1A to some small candidate set of features as shown in FIG. 1B.

Points of high curvature are known to be good features. Sometimes the pen moves slowly in these regions. One accepted input filter takes advantage of this fact. It selects some n and then throws away every nth input point. This is called nex sampling. It is fast, but throwing out points arbitrarily can, in the extreme, miss features. Used in moderation of course, it can speed any input filter.

The candidate features found by the input filter must be those that make it easy for a sophisticated, slow feature-finder to extract the really significant features as shown in FIG. 1C that will ultimately be used to recognize the stroke as shown in FIG. 1D.

This invention deals only with how to build a fast input filter that finds candidate features in the device input. Subsequent feature extraction, stroke recognition, and the combining of strokes into symbols are not part of the invention.

However, the input filter must produce candidate features that make good input to the feature-finding step. One accepted feature-finder, is an angle-threshold filter, which experiment shows, does work with this input filter.

The input filter reduces a stream of input points to a small number of output points. The input is sampled at a number of points, a, b, and c as shown in FIG. 2A. A detailed flow chart description of this filtering is set forth relative to FIG. 6. If the cross product of vectors ab and bc is below some set threshold, then points b and c are advanced, with b moving slower than c in FIG. 2B. If the new cross product is greater than the threshold, point b is saved as in FIG. 2C for later output, and new points a, b, and c, are established as in FIG. 2D. This is repeated until point c reaches the end of the stroke.

The output as shown in FIG. 3 is a sparse set of points far apart in straight regions, and closer together in regions of high curvature, unlike input filters as in the Greanias U.S. Pat. No. 4,365,235. This happens because the cross product of two vectors is a function of the lengths of the vectors and the angle between them. A right-angle bend or long length increases the cross product. The cross products between successive vectors is about the same.

The algorithm produces vectors of roughly equal length while the curvature is constant. It avoids producing alternately long and short vectors that, nevertheless, also have equal cross products between them. This can easily happen with a simpler algorithm.

The algorithm as described so far needs, per input point, 4 subtractions to make the vectors between a, b, and c. Subtractions count as additions in the final sum of computation cost. The cross product uses two multiplications, a subtraction, and an absolute value (which is counted as an addition). Moving points b and c requires 2 more additions.

This totals to 2 multiplications and 7 additions per input point. Later the need for 2 more multiplications and 2 more additions is shown. Computations are inherently fixed-point, because the input points are integers, and no division takes place. Floating point is unwanted and unhelpful.

Some other algorithms need pre-filter smoothing of points to eliminate x-y jitter. Small input jitter from hardware noise, quantization, or wavering of the user's hand produces small wiggles that are not features, which should be ignored by the feature extractor. One way to ignore jitter is to smooth the input with a pre-filter, for example a moving-average convolution or running average filter as shown in the Blesser U.S. Pat. No.4,375,081, before the input is sent to the feature finder. With the x-y jitter smoothed away, the feature-finder does not see it, and will not mistake jitter for a feature. Smoothing is slow, because all input points must be processed before filtering.

The algorithm of the invention needs no pre-filtering, which consumes extra computation, because mathematical properties of the cross product substantially eliminate x-y jitter. Short lines have small cross products. The cross product is the length of one vector, times the length of another, times the sine of the angle between them. If the vectors are short, no angle can make the cross product larger than the threshold.

FIG. 4A shows input from a noisy device as it slowly draws a line. Nine input points are numbered in order. Algorithm points a, b, and c form vectors too small for their cross product to exceed the threshold irrespective of the angle between them. As shown in FIG. 4B, points b and c have advanced, but little has changed.

As shown in FIG. 4C, points a, b, and c are far enough apart that a large angle would put the cross product over the threshold, but the points are beginning to lie along the line. At this time the x-y jitter has been successfully ignored, and the next thing the cross product finds is a candidate feature.

FIG. 4D shows a cross product exceeding the threshold, and producing point 5 as output. This happens when the algorithm finds a potential feature, and the data appears to have turned a corner at point 5. Later, more sophisticated processing decides if this potential feature really is a feature or not.

FIG. 5 shows a general block diagram of the recognition system of the invention. A writing surface such as portable combination tablet/display 1 records successive positions of a writing instrument such as an electronic stylus 2. These points are sent to an attached computer system in the base of a tablet 3. A computer 4 performs the logical operations shown in the logic blocks of tablet 3, and is a microprocessor such as an Intel 80286/386/486 base processor system, typically limited in fast computation to fixed-point operations, with a small amount of memory perhaps 1 megabyte to keep the whole package light-weight. The computer 4 reads the points from the tablet 1 into an input unit 5. Normally, the input unit echoes back a display of the stroke as it is drawn, to the tablet 1 via a display driver 13. These many raw points are filtered by a quick input filter 6, which is the subject of this invention. The filtered points are provided to a recognizer 7, which matches the input stroke to the most similar stroke in an alphabet store 8. The identity of the input stroke is then provided to a semantic routine 9, which looks up, in block 10, what action the stroke should cause, and tells an application program 11 what to do with application data 12. One or more of these processes (6,7,9, or 11) can erase the initial stroke display echoed by the tablet input unit 5 via display driver 13, and then display some revised version of the stroke or some semantic result caused by drawing the stroke.

Figure 6:
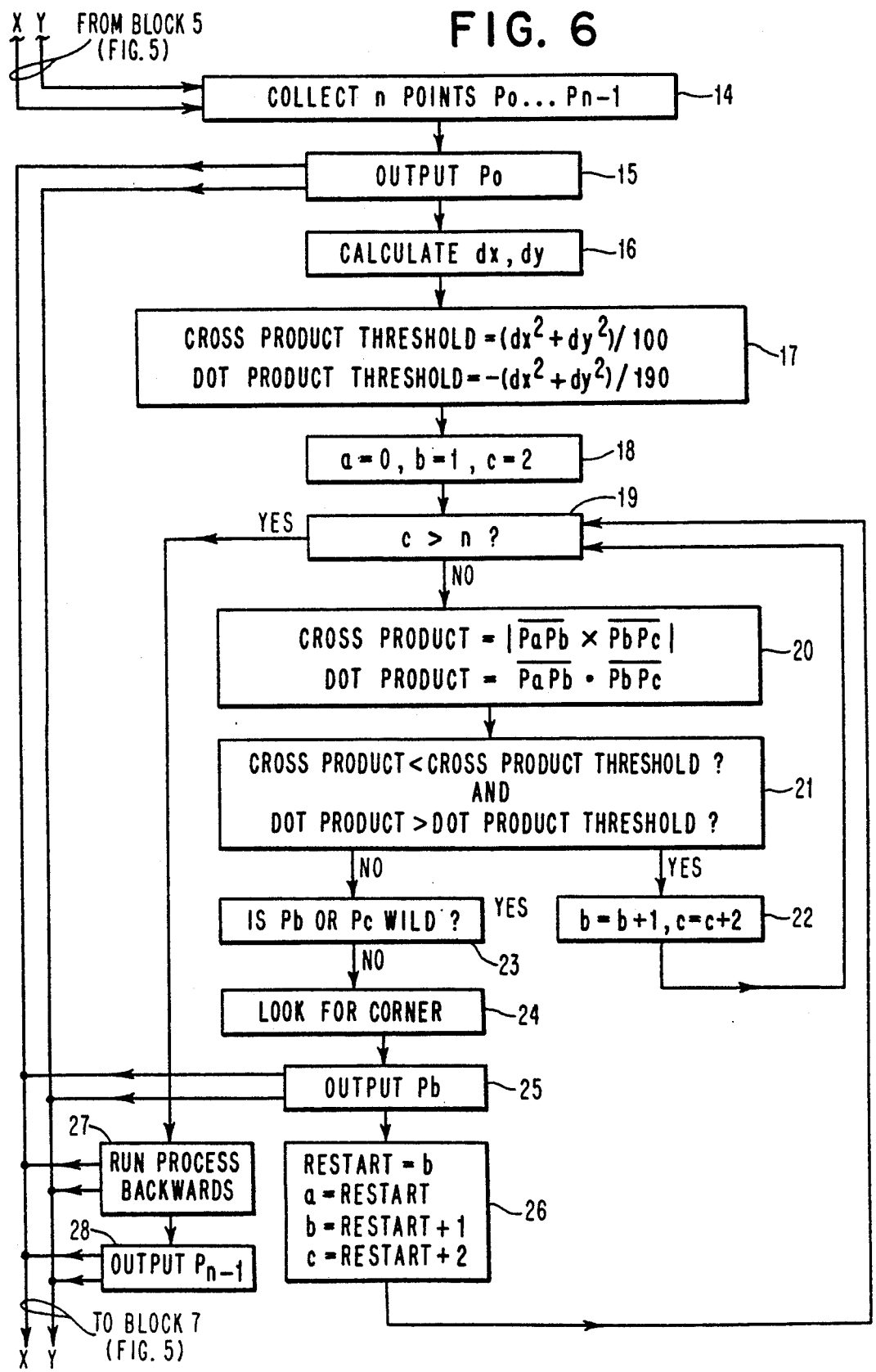
FIG. 6 is a flow chart of the cross product filter which is shown generally in the block diagram of FIG. 5.
Figure 7:
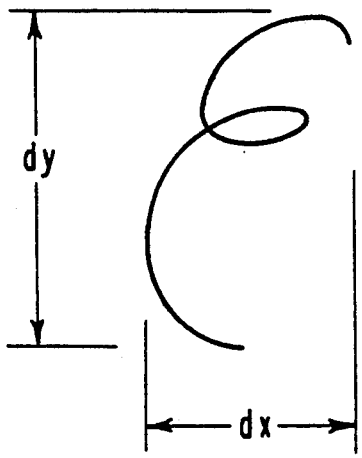
FIG. 7 illustrates the size of a representative stroke.

FIG. 6 is a detailed flow chart of the cross-product input filter 6. A series of indicia such as a plurality of n indicium such as points Po... Pn−1, where n is an integer, are collected in block 14 from the tablet input unit 5 (FIG. 5). A first point (P0) is selected for output to block 15, and to block 7 of FIG. 5. The size of the stroke is calculated at block 16. FIG. 7 shows what is meant by the size of a stroke. The x and y size (dx and dy) are in tablet units, about 0.1 mm. Based on the size of the stroke, thresholds are set in block 17 for the cross product and the dot product so that identically-shaped strokes of different sizes will produce the same output points. Lastly, the points to be inspected by the filter are set initially to the first (a), second (b), and third (c) points in block 18. As long as c has not overrun the list of n points as shown in block 19, the filter inspects the relation (cross product and dot product) between points Pa, Pb, and Pc in block 20. Details of block 20 are set forth in FIG. 8. As long as the cross product is less than its threshold as shown in block 21, insufficient area has built up to send point Pb to the output. Likewise, as long as the dot product is greater than its threshold as determined at block 21, no sudden, large reversal of direction has taken place, such as can happen with a thin loop. This is shown in detail in FIG. 2A. This being the case, there is no output, and pointers b and c are advanced as shown in block 22. This is shown in detail in FIG. 2B. If one of these conditions fails, point Pb should be sent to output, but only if it is not a wild point as shown in block 23. Details of block 23 are set forth in FIG. 10. Likewise, if point Pc is wild as shown in block 23 it may have spuriously triggered point Pb to be sent to the output. If either Pb or Pc is wild no output is produced, and pointers are advanced as shown in block 22. Point Pb is almost ready for output, but first look between points Pb and Pc for any point that better falls on a corner, as shown in block 24. Details of block 24 are set forth in FIG. 15. That point is then made Pb. Point Pb is sent to the output as shown in block 25. This is shown in detail in FIG. 2C. The filter restarts from point Pb in block 26, just as it did initially from point P0 in block 18. This is shown in detail in FIG. 2D. That is, the a in FIG. 2C starts at point b (FIG.2D), b=b (FIG. 2D)+1, and c=b (FIG. 2D)+2). When c overruns the end of the list of n points as previously shown in block 19, then the filter is almost finished, but it has failed to consider points between Pb and Pn−1 for output. This is accomplished in block 27 by running the same filter backwards over these remaining points and producing a maximum of one intermediate point for output. Details of block 27 are set forth in FIG. 18. Finally, the last input point is sent to the output block 28, and the filter is finished.

Figure 8:
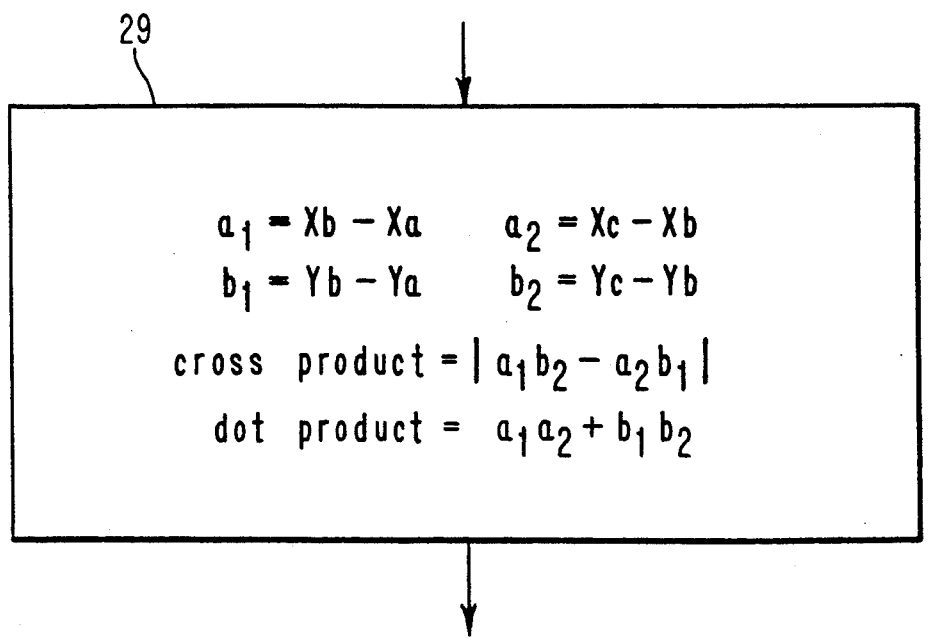
FIG. 8 details the cross-product and dot-product calculations which are shown generally in FIG. 6.

FIG. 8 shows details the cross-product and dot-product calculations in block 29. These were shown in general in logic block 20 of FIG. 6.

Hardware glitches occasionally produce a spurious, outlying wild point. Pre-filter smoothing algorithms that use a moving average or running average must find wild points first in a tedious check of all input points, because the moving average would distribute the error to good points.

The cross-product input filter does not move the input points. A wild point, and the points just preceding and following it (FIG. 9), pass through the filter as candidate features. Any method can then be used to find and remove the offending points just before filter output, or as a later step. Any method is sure to be cheap, because it needs to inspect comparatively few points.

The dot product is used to check for wild points. A large negative dot product between successive output vectors suggests that the point in the middle is wild. A simple test against a threshold may wrongly indicate a wild point if the points just before or just after the wild point, but this may be desirable anyway to avoid the output of two points very close together. The transition from FIG. 9B to FIG. 9C shows this. Checking for wild points adds less than 1% to filter execution time.

Figure 10:
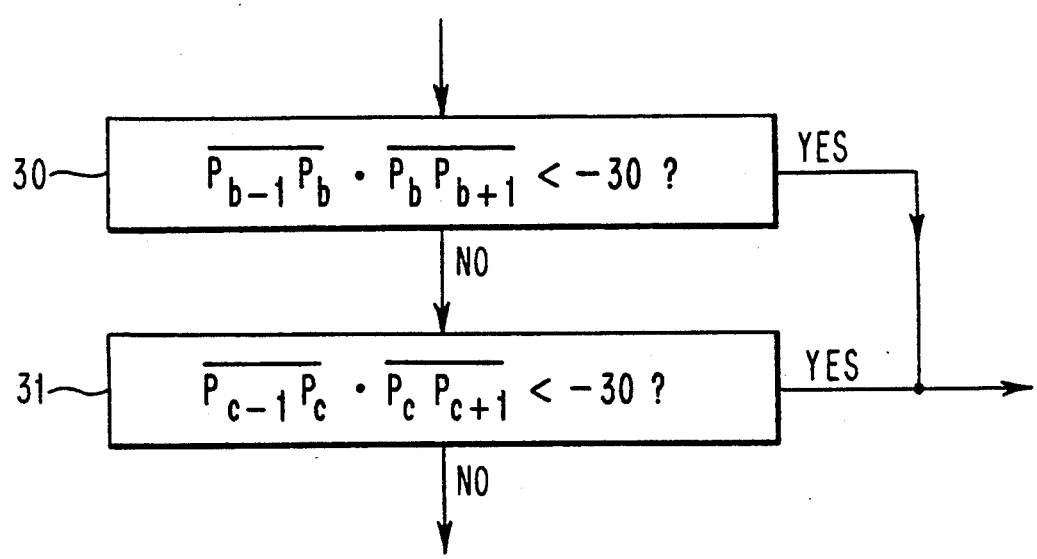
FIG. 10 is a detailed flow chart of how to detect wild points in a stroke.

FIG. 10 shows how to detect wild points, which is shown in general in block 23 of FIG. 6. Points adjacent to Pb are formed into vectors in block 30. A large negative dot product, for example −31, suggests that point Pb may be far from points Pb−1 and Pb+1, and is therefore likely wild. Output of Pb is avoided, to be on the safe side. Likewise with point Pc as shown in block 31, which if wild, may have triggered point Pb to be sent to the output, when it should not be sent.

There are two ways to tune the algorithm of the invention. The size of the cross-product threshold and the relative rates of travel of points b and c determine the size of input wiggles to ignore. Rate of travel is the number of input points skipped per step, not the distance. Ignoring small wiggles is danger-prone. Once missed, they cannot be recovered by later processes. However, detecting small wiggles, if they do not correspond to real features, creates trouble for later processing that tries to find real features.

A large cross-product threshold ignores large wiggles. This threshold should, however, be scaled by the stroke size. If the size of the threshold used in the cross-product text is multiplied by the square of the x-y size of the stroke, then the number and position of candidate features are the same for the same-shaped stroke drawn large or small. This scaling works well in practice.

Figure 11D:
Figure 11E:
Figure 11F:
Figure 11G:

The size of the wiggles the algorithm finds is also controlled by the relative speed of the two traveling points, b and c. If c travels only sightly faster than b (FIGS. 11A–11B) then a small wiggle will be found (FIG. 11C). If c travels much faster than b (FIGS. 11D–11F), then the same small wiggle will be overlooked (FIG. 11G). Experience suggests that c should travel 1.5 to 2 times the speed of b.

Figure 12A:
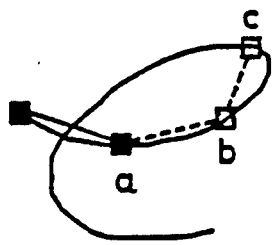
FIGS. 12A, 12B and 12C illustrate how the cross product by itself misses thin loops in a stroke.
Figure 12B:
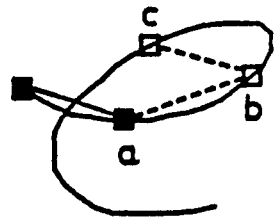
Figure 12C:
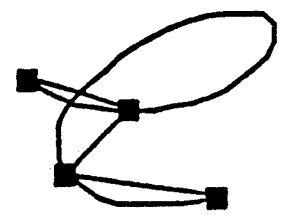
Figure 13A:
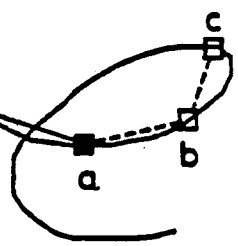
FIGS. 13A, 13B, 13C and 13D illustrate how the dot product finds thin loops in a stroke which are missed by the cross product.
Figure 13B:
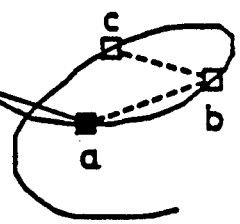
Figure 13C:
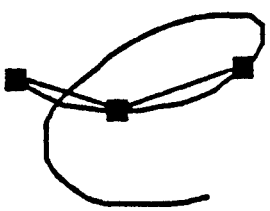
Figure 13D:
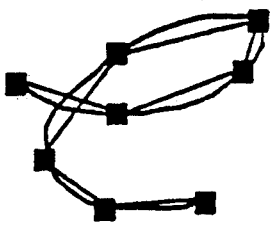

The cross product, by itself, cannot detect a change of direction (FIGS. 12A–12C), because it tests the sine of the angle change. Direction changes close to 0-degrees or to 180-degrees look about the same. Thin loops are missed completely.

A dot product test made on each input point finds these reversals (FIGS. 13A–13D), which, when they occur, are reason enough to save point b and restart. This fix is similar to traditional dot-product cusp detection. Here, the threshold is negative to detect only substantial direction reversal, not small jitter. The cost of the dot product is 2 multiplies and 2 additions. This brings the algorithm's total arithmetic cost to 4 multiplies and 9 additions.

The cross product and dot product together, nearly always put an output point at or very close to the natural corners of the stroke, but occasionally they miss (FIG. 14A). This is more frequent when point c moves much faster than point b.

This is so rarely a problem, it may not need fixing, but FIGS. 14B–14E illustrates how finding the corner can be assured. Since very few of the total number of input points need be inspected, most any corner-finding test will be computationally cheap.

Figure 15:
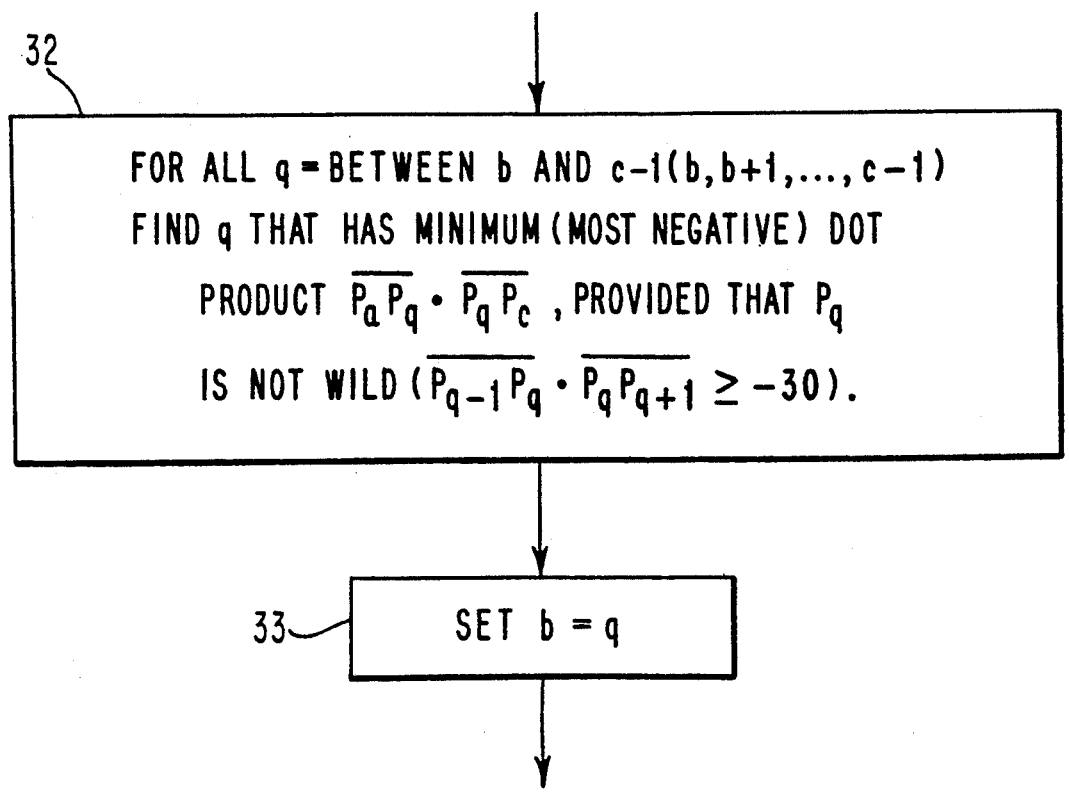
FIG. 15 illustrates how the deepest part of a corner of a stroke is found.

FIG. 15 shows how the deepest part of the corner is found. This was shown in general in block 24 of FIG. 6. Pointer b, as shown in block 32, is repositioned between its current position and Pc to give the minimum (most negative) dot product, provided that Pb is not a wild point. Then, this new point Pb is sent to block 33. In the next step, Pb is sent to block 25 (FIG. 6).

Small features at the end of the stroke can be missed, because sometimes they produce only a small change in the cross product (FIGS. 16A–16C). Also, when the algorithm hits the end of the stroke at point c, it has had a chance to consider saving points only up to b, but not between Pb and Pn−1.

One fix is to run the algorithm backwards until it hits the old b stopping point (FIGS. 17A–17C). This computation cannot be considered extra cost, since it only closes a gap produced when the algorithm stopped early.

Figure 18:
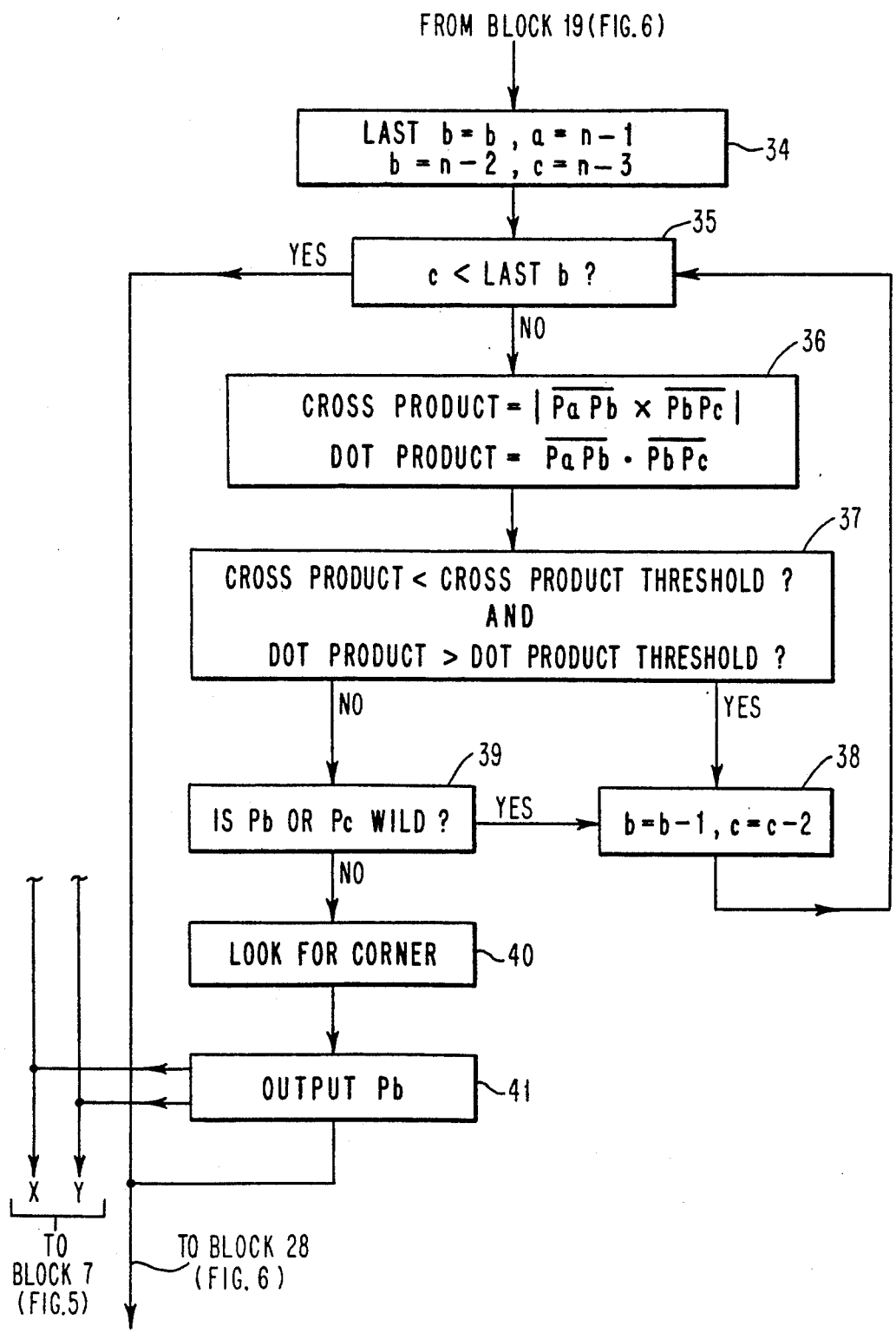
FIG. 18 is a flow chart illustrating how features are found at the end of a stroke by running the filter backwards to where it stopped in its forward pass.

FIG. 18 shows how features at the end of the stroke are found by running the filter backwards to where it stopped in its forward pass. This details the workings of logic block 27 of FIG. 6. Pointers a, b, and c as shown in block 34 are initialized to the last three points of the stroke. As long as c has not reached the old point Pb as shown in block 35, the filter inspects the relation (cross product and dot product) between points Pa, Pb, and Pc as shown in block 36. The procedure works about as well if, instead, the new pointer b is allowed to reach the old point Pb, which covers the gap better, but which seems to make no practical difference in the output. As long as the cross product is less than its threshold as shown in block 37, and the dot product is greater than its threshold as shown in block 37, there is no output and pointers b and c are advanced backwards as shown in block 38. If one of these conditions fails, point Pb is sent to the output, but only if it or point Pc is not a wild point as shown in block 39 (using the process in FIG. 14). If either is wild, no output is produced and the pointers are advanced as shown in block 38. Next, an inspection is made between points Pa and Pc to find a point that better falls on a corner as shown in block 40 (using a process similar to that described relative to FIG. 15). This point is made Pb. Then point Pb is sent to output block 41, and the filter proceeds to the next step (FIG. 6 block 28), which sends the last point of the stroke to the output, and the filter is finished at block 28. This backwards-looking process is allowed a maximum of one point for output, because it explores only a short stretch at the end if the stroke, in which there is likely to be only one feature.

I claim:

1. A method of filtering a first series of indicia comprised of n indicium representing a stroke of a writing instrument on a writing surface, said method comprising the steps of:
   detecting said first series of indicia generated by said writing instrument on said writing surface; and
   taking the cross-product of successive vectors formed between successive indicium in said first series of indicia comprising said stroke, to provide a filtered stroke having a second series of indicia comprised of m indicia where $m < n$.

2. The method of claim 1, including the step of displaying said filtered stroke on said writing surface.

3. A method of filtering a first series of n digital signals representing n points on a stroke of a stylus on a tablet, said method comprising the steps of:
   detecting said first series of n digital signals generated by said stylus on said tablet; and
   taking the cross-product and the dot product of successive vectors defined by successive points on said stroke to provide a filtered stroke formed of a second series of m points, where $m < n$.

4. A method of filtering a first series of indicia comprised of n indicia representing a stroke of a writing instrument on a writing surface, to produce a second series of indicia comprised of m indicia, where $m < n$, said method comprising the steps of:
   collecting said first series of indicia by said writing instrument on said writing surface;
   determining a cross-product threshold value for a cross-product of successive vectors formed between successive ones of said n indicia of said first series of indicia comprising said stroke; and
   computing the cross-product of successive vectors formed between successive ones of said n indicia of said first series of indicia comprising said stroke, to produce a given one of said m indicia in said second series of indicia whenever said cross-product has a predetermined relationship to said cross-product threshold value.

5. The method of claim 4, including the steps of:
   computing the dot-product of successive vectors formed between successive ones of said n indicium of said first series of indicia comprising said stroke;
   determining a dot-product threshold value for said dot-product of successive vectors formed between successive ones of said n indicia of said first series of indicia comprising said stroke;
   producing said given one of said m indicia in said second series of indicia only when said dot-product has a predetermined relationship to said dot-product threshold value.

6. A method of filtering a series of signals representative of n points, where n is an integer, on an input stroke produced by a writing instrument on a writing surface, for producing an output stroke comprised of m points, where m is an integer, and $m < n$, said method comprising the steps of:
   (a) collecting said series of signals representing said n points on said input stroke;
   (b) outputting the first of said n points as the first of said m points of said output stroke;
   (c) inspecting at least points a, b and c of said n points on said input stroke starting with the first of said n points;
   (d) determining the cross product of vectors ab and bc;
   (e) setting $b = b + 1$ and $c = c + 2$ if the cross product of ab and bc are below a predetermined threshold, and repeat step (d);
   (f) outputting b as one of said m points of said output stroke if the cross product of ab and bc are not below said predetermined threshold;
   (g) restarting the inspection of points a, b and c at the point b output in step (f), with
   a = restart point
   b = restart point + 1
   c = restart point + 2;
   (h) repeating steps (d) through (g) until c is greater than n; and
   (i) outputing n as the last point of said m points in said output stroke.

7. The method of claim 6, including the steps of:
   (j) restarting the inspection of points a, b and c at the last b output in step (f), if $c > n$, with:
   a = n − 1
   b = n − 2
   c = n − 3;
   (k) determining the cross product of vectors ab and bc;
   (l) setting $b = b − 1$ and $c = c − 2$ if the cross product of ab and bc are below a predetermined threshold, and repeat step (k); and
   (m) outputting b as one of said m points of said output stroke if the cross product of ab and bc are not below said predetermined threshold.

8. A method of filtering a series of signals representative of n points Po... Pn−1, where n is an integer, on an input stroke produced by a writing instrument on a writing surface, for producing an output stroke comprised of m points, where m is an integer, and $m < n$, said method comprising the steps of:
   (a) collecting said series of signals representing said n points Po... Pn−1 on said input stroke;
   (b) calculating the size of said input stroke;
   (c) calculating a cross product threshold and a dot product threshold based on the size of said input stroke;

(d) outputting Po as the first of said m points of said output stroke;
(e) inspecting at least points a, b and c of said n points on said input stroke starting with Po, with:
   $a=0$
   $b=1$
   $c=2$;
(f) determining if $c>n$;
(g) determining the cross product and dot product of vectors ab and bc;
(h) setting $b=b+1$ and $c=c+2$ if the cross product of ab and bc are below said cross product threshold and the dot product of ab and bc are greater than said dot product threshold, and repeat steps (f) and (g);
(i) determining if point b or c is wild;
(j) setting $b=b+1$ and $c=c+2$ if b or c is wild, and repeat steps (f) and (g);
(k) outputting b as one of said m points of said output stroke if the cross product of ab and bc are not below said cross product threshold, and the dot product of ab and bc are not above said dot product threshold, and b and c are not wild points;
(l) restarting the inspection of points a, b and c at the point b output in step (k), with:
   $a=$ restart point
   $b=$ restart point $+1$
   $c=$ restart point $+2$;
(m) repeating steps (f) through (m) until c is greater than n; and
(n) outputting $Pn-1$ as the last point of said m points in said output stroke;

9. The method of claim 8, including the steps of:
(o) restarting the inspection of points a, b and at the last b output in step (k), if $c>n$ in step (f), with:
   $a=n-1$
   $b=n-2$
   $c=n-3$;
(p) determining if $c<$ last b;
(q) determining the cross product and dot product of vectors ab and bc;
(r) setting $b=b-1$ and $c=c-2$ if the cross product of ab and bc are below said cross product threshold, and the dot product of ab and bc is above said dot product threshold, and repeat steps (p) and (q);
(s) determining if points b or c are wild;
(t) setting $b=b-1$ and $c=c-2$ if b or c is wild, and repeat steps (p) through (r); and
(u) outputting b as one of said m points of said output stroke if the cross product of ab and bc are not below said cross product threshold, and the dot product of ab and bc are not above said dot product threshold, and b and c are not wild points.

* * * * *